United States Patent Office 2,745,855
Patented May 15, 1956

2,745,855

ALKYLENE OXIDE CONDENSATE OF DISCARD PALM OIL

Everett N. Case, Homewood, Ill., assignor, by mesne assignments, to Sinclair Oil and Gas Company, Tulsa, Okla., a corporation of Maine No Drawing. Application April 14, 1951,
Serial No. 221,127

3 Claims. (Cl. 260—410.6)

My invention relates to new chemical products and a new process for breaking water-in-oil type petroleum emulsions.

A large percentage of crude oil production is obtained in the form of water-in-oil emulsions, i. e., oil containing water in the form of fine droplets dispersed throughout the body of oil. These emulsions are relatively stable and do not become resolved within a reasonable time by mere standing. These crude oil emulsions must be resolved before the subsequent treatment of the crude oil to recover useable fractions can be accomplished. In addition, transportation of the crude oil through pipelines requires the resolution of the emulsion to reduce to a minimum the water content of the oil for maximum pipeline efficiency as well as to minimize corrosion of the pipeline. Many procedures for breaking crude oil emulsions have been proposed and practiced. Such procedures include physical as well as chemical treatments of the emulsions. Treatment with chemical demulsifiers is preferred because of the simplicity of the field operation. However, all crude oil emulsions do not respond to the same chemical treatment. Therefore, a great variety of chemical demulsifiers have been prepared and are used either independently or in admixture to produce a break of a particular oil field emulsion or a particular type of oil field emulsion.

I have discovered that an alkylene oxide can be condensed with discard palm oil to form very effective demulsifiers. The alkylene oxides having two to three carbon atoms, in general, are useful, but ethylene oxide appears to have particular effectiveness. Thus according to my invention, water-in-oil petroleum emulsions can be resolved effectively by thoroughly mixing with the emulsion a small amount of a demulsifier including a discard palm oil-alkylene oxide condensation product.

Discard palm oil is the waste palm oil discarded from the hot dip tinning of sheet steel after the palm oil has lost its effectiveness to produce a good quality tin plate. Discard palm oil has different chemical characteristics than fresh palm oil as indicated by the following approximate analytical values:

| | Discard Palm Oil | Fresh Palm Oil |
|---|---|---|
| Iodine Number | 44.7 | 56.1 |
| Acid Number | 14.9 | 18.6 |
| Saponification Number | 187.9 | 199.7 |
| Phenol Number | 7.9 | 1.6 |
| Ash [1] | 1.8 | 0.01 |

[1] The difference in ash content is probably due to tin, tin oxide and other tin compounds contained in the discard palm oil.

While I am unable to explain the reason, I have found that while the condensation products of fresh palm oil and ethylene oxide exhibit only mediocre demulsifying properties, the condensation products of discard palm oil and ethylene oxide exhibit very surprising demulsifying properties. For example, condensation products containing approximately equal weights of ethylene oxide and palm oil were prepared, one with fresh palm oil and the other with discard palm oil. These condensation products were prepared under the same reaction conditions and tested for effectiveness by treating a fresh oil field emulsion. The product prepared from discard palm oil gave a clean break of the emulsion when only about 0.4 cc. of a 5% solution in isopropanol of a demulsifier comprising 20% of the discard palm oil-ethylene oxide condensation product and 80% of Bardol base (alkylated aromatic sulfonate) was added to a sample of fresh oil field emulsion in a testing bottle (100 cc.) and allowed to stand for about ¼ hour after thorough mixing by shaking. In contrast, however, the product prepared from fresh palm oil gave little or no resolution of the same oil field emulsion when tested in substantially the same manner.

In general, my new products are prepared by condensing discard palm oil and ethylene oxide at elevated temperatures up to about 180° C. and superatmospheric pressures up to about 100 p. s. i. g. in the presence of a small amount, e. g., 0.5 to 1.0 weight percent based on the discard palm oil, of an alkaline catalyst, for example, potassium hydroxide or sodium hydroxide. The preparation of the condensation products of my invention is substantially the same whether ethylene oxide or propylene oxide is employed, although when employing propylene oxide, I have found that slightly higher reaction temperatures are necessary to obtain a satisfactory reaction rate. The alkylene oxide is added to hot discard palm oil either intermittently in small batches or continuously at a controlled rate to control reaction conditions. The continuous addition of the alkylene oxide is preferred because of ease of operation and control of reaction conditions.

Condensation products prepared from discard palm oil and either ethylene oxide or proplyene oxide are good demulsifiers and produce a clean break of water-in-oil emulsions. However, condensation products prepared from propylene oxide require a somewhat greater weight ratio of alkylene oxide to discard palm oil to obtain demulsification activity equal to condensation products prepared from ethylene oxide. While ethylene oxide is more efficient than propylene oxide on a per pound basis for producing the demulsifiers of my invention because of the higher oxygen to carbon ratio of ethylene oxide, the use of propylene oxide which is a liquid rather than a gas has the advantage that it is easier to handle in the condensation reaction. It will be understood, of course, that the use of one of these alkylene oxides does not preclude the use of the other. That is, the demulsifiers of my invention include condensation products which are prepared by condensing discard palm oil with both ethylene oxide and propylene oxide, the condensation reaction being started with one and completed with the other.

The following description is given as an example of a typical operating procedure for the preparation of discard palm oil-ethylene oxide condensation products.

To a reaction vessel having a suitable agitator or stirring device is charged 741 pounds of discard palm oil and 3.7 pounds of potassium hydroxide dissolved in the least possible amount of water. The charge is heated with stirring to the initial reaction temperature of about 160° C. During the heating operation, the reaction vessel is evacuated and nitrogen gas admitted to atmospheric pressure in order to reduce the oxygen content of the atmosphere over the discard palm oil to below about 0.1% oxygen by volume. When it is not possible or feasible to evacuate the reaction vessel, the air should be purged by passing an inert gas into and out of the reaction vessel. Other inert gases which can be used in addition to nitrogen are methane, ethane, propane or butane.

When the atmosphere over the discard palm oil is free of oxygen, i. e., contains less than about 0.1% by volume, as determined by Orsat analysis, the reaction vessel is sealed.

When the temperature of the discard palm oil in the reaction vessel has reached about 162° C., ethylene oxide is introduced into the vessel batchwise through an ethylene oxide feed system which has previously been purged by blowing with nitrogen. Stirring is continued throughout the entire reaction.

The first addition of ethylene oxide consists of about 28 pounds. It should be noted that ethylene oxide reactions can be hazardous if not carefully controlled, and, therefore, this first addition and subsequent additions of ethylene oxide should be decreased in amount if the pressure developed in the reaction vessel exceeds about 80–90 p. s. i. g. No more ethylene oxide is added until this first charge has reacted.

The reaction is followed by observing both pressure and temperature. Completion of the reaction is indicated when the pressure drops to 15 p. s. i. g. or less. A slight temperature increase usually accompanies the pressure drop due to the exothermic nature of the reaction. When the pressure has dropped to about 15 p. s. i. g. after the addition of the first 28-pound batch of ethylene oxide, another portion of ethylene oxide is added. The addition of ethylene oxide to the discard palm oil is continued in this manner until the temperature rises to about 180° C. At this point heating is discontinued and preparation made for cooling the reaction mass in order to maintain a temperature of about 180°–190° C. The reaction at this point is proceeding smoothly with the ethylene oxide being added continuously at a rate as fast as is consistent with a temperature of 180°–190° C. and a pressure of 80–90 p. s. i. g. but not exceeding about 36 pounds per minute.

In the reaction described above, the heat produced by the exothermic reaction is employed to raise the temperature of the reaction mass to the operating range of 180°–190° C. Alternatively, the discard palm oil can be raised to the operating temperature of 180°–190° C. by the application of extraneous heat before the ethylene oxide is introduced.

When a total of 556 pounds of ethylene oxide has been added, the continuous addition of ethylene oxide is stopped and the reaction allowed to continue until the pressure drops to about 15 p. s. i. g. At this point 456 pounds of the discard palm oil-ethylene oxide condensation product is withdrawn from the reaction vessel.

The addition of ethylene oxide is resumed and 48 pounds more of ethylene oxide is added continuously in the same manner. When the reaction of this additional amount of ethylene oxide is completed, as indicated by the pressure drop, a second portion of 456 pounds is withdrawn.

A third addition of ethylene oxide of 23 pounds is made in the continuous manner. When this last amount of ethylene oxide has completely reacted, the product remaining in the reaction vessel is withdrawn.

This overall reaction consists of the addition of 627 pounds of ethylene oxide to 741 pounds of discard palm oil. The three portions of product withdrawn represent condensation products of ethylene oxide and discard palm oil in which the weight ratio of ethylene oxide to discard palm oil is 0.75, 0.85 and 0.95, respectively. The overall reaction time, not including the time required to heat the discard palm oil to initial reaction temperature, is approximately four hours.

In substantially the same manner as described in the typical operating example, I have prepared a series of condensation products of ethylene oxide and discard palm oil having weight ratios of ethylene oxide to discard palm oil in the range from about 0.2 to about 2.5. These condensation products are thin, black, mobile liquids, and are water dispersible and oil-soluble. After field testing on fresh oil field emulsions, I have found that the condensation products containing ethylene oxide and discard palm oil in a weight ratio range of from about 0.5 to 1.75 are the most desirable from the standpoint of emulsion breaking properties and condensation product cost. On the basis of my field tests, a condensation product containing approximately equal amounts by weight of ethylene oxide and discard palm oil gives optimum results.

My demulsifiers can be used independently or in admixture with conventional demulsifiers. I have found that particularly advantageous demulsifiers are those containing a discard palm oil-ethylene oxide condensation product in admixture with an alkali metal mahogany petroleum sulfonate, an alkylated aryl sulfonate in particular an ammonium salt of a propylated condensed aromatic monosulfonic acid, and an oxidized vegetable oil, for example, blown castor oil. The particular demulsifiers to be mixed with a discard palm oil-ethylene oxide condensation product to form the four-component demulsifier are selected according to the particular emulsion to be treated.

My demulsifier comprising the discard palm oil-ethylene oxide condensation product, either alone or in admixture with other conventional agents, is employed with advantage in the form of a dilute solution prepared by mixing the demulsifier with a suitable solvent such as isopropyl alcohol, a high aromatic solvent, or oxygenated organic solvents such as aldehydes and ketones.

The ratio of demulsifier to oil field emulsion required to produce a clean break of the emulsion will vary considerably depending upon the particular emulsion to be treated. A representative range of parts of demulsifier to parts of oil field emulsion is from 1 to 2000 to as much as 1 to 20,000 or more with one part demulsifier, i. e., active ingredients not including the diluent, to 5,000 parts of a fresh oil field emulsion, as produced from the oil well, as an average.

The diluted or undiluted demulsifier including a discard palm oil-ethylene oxide condensation product can be introduced into the oil field emulsion in any of the conventional methods. For example, the demulsifier can be introduced into the oil well tubing ahead of the choke on a flowing well or ahead of the pump on a pumping well. Alternatively, it may be introduced into the emulsion in the pipeline leading to a storage tank or in the "down-the-hole" method. The real requirement in the use of any of these methods of introduction is that the demulsifier be mixed thoroughly with the oil field emulsion before the emulsion is introduced into a quiescent settling zone where it separates into an oil layer and a water layer.

I claim:

1. The condensation product prepared by condensing discard palm oil with an alkylene oxide having two to three carbon atoms in which the weight ratio of alkylene oxide to discard palm oil is in the range of about 0.2 to 2.5.

2. The condensation product prepared by condensing discard palm oil with ethylene oxide in which the weight ratio of ethylene oxide to discard palm oil is in the range of about 0.5 to 1.75.

3. The condensation product prepared by condensing approximately equal amounts by weight of discard palm oil and ethylene oxide.

References Cited in the file of this patent

UNITED STATES PATENTS

| | | |
|---|---|---|
| 1,970,578 | Schoeller et al. | Aug. 21, 1934 |
| 2,307,058 | Moeller | Jan. 5, 1943 |
| 2,382,931 | Woodhouse et al. | Aug. 14, 1945 |
| 2,436,219 | MacLaurin | Feb. 17, 1948 |
| 2,478,820 | Griffin | Aug. 9, 1948 |
| 2,614,983 | Caldwell et al. | Oct. 21, 1952 |